United States Patent
Pialot, Jr. et al.

(10) Patent No.: US 10,343,215 B2
(45) Date of Patent: Jul. 9, 2019

(54) MACHINE AND METHOD FOR POWDER-BASED ADDITIVE MANUFACTURING

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Frederic Pialot, Jr., Clermont-Ferrand (FR); Gilles Walrand, Clermont-Ferrand (FR); Pierre Wiel, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 542 days.

(21) Appl. No.: 14/403,679

(22) PCT Filed: Jun. 3, 2013

(86) PCT No.: PCT/EP2013/061402
§ 371 (c)(1),
(2) Date: Nov. 25, 2014

(87) PCT Pub. No.: WO2013/178825
PCT Pub. Date: Dec. 5, 2013

(65) Prior Publication Data
US 2015/0139849 A1   May 21, 2015

(30) Foreign Application Priority Data
Jun. 1, 2012 (FR) .................... 12 55089

(51) Int. Cl.
*B28B 1/00* (2006.01)
*B22F 3/105* (2006.01)
(Continued)

(52) U.S. Cl.
CPC ........ *B22F 3/1055* (2013.01); *B23K 15/0086* (2013.01); *B23K 26/342* (2015.10);
(Continued)

(58) Field of Classification Search
CPC ............ B22F 3/1055; B22F 2003/1056; B22F 2003/1058; B23K 26/342; B23K 15/0086;
(Continued)

(56) References Cited

U.S. PATENT DOCUMENTS 5,934,343 A * 8/1999 Gaylo .................... B22F 3/004
141/12
5,957,006 A * 9/1999 Smith ................... B22F 3/1055
156/62.2

(Continued)

FOREIGN PATENT DOCUMENTS

DE          10235427         2/2004
DE       102005014483       10/2006
(Continued)

OTHER PUBLICATIONS

DE202011003443, Uckelmann et al., published Feb. 2012 (machine translation).*
(Continued)

*Primary Examiner* — Keith Walker
*Assistant Examiner* — John A Hevey
(74) *Attorney, Agent, or Firm* — Dickinson Wright PLLC

(57) ABSTRACT

The machine is of the type which uses an energy beam which acts on a powder layer in a working zone. The machine has a device for layering said powder and which includes a means for storing powder, a means for distributing powder, (Continued)

a feeding means that transfers powder from the storage means to the distributing means, and a metering means that controls the quantity of powder transferred from storage means to distributing means. The storage means is positioned higher than the working zone, the feeding means utilizes gravity, and in use, the feeding means and the metering means move with the distributing means. The machine has two separate working zones and two separate working trays that move independently of one another. Each of the working trays is associated with only one working zone, and the layering device is common to both working zones.

19 Claims, 7 Drawing Sheets

(51) Int. Cl.
| | | |
|---|---|---|
| *B23K 15/00* | (2006.01) | |
| *B33Y 30/00* | (2015.01) | |
| *B23K 26/342* | (2014.01) | |
| *B29C 64/153* | (2017.01) | |
| *B29C 70/44* | (2006.01) | |
| *B33Y 10/00* | (2015.01) | |

(52) U.S. Cl.
CPC ............ *B28B 1/001* (2013.01); *B29C 64/153* (2017.08); *B29C 70/443* (2013.01); *B33Y 30/00* (2014.12); *B22F 2003/1056* (2013.01); *B22F 2003/1058* (2013.01); *B33Y 10/00* (2014.12); *Y02P 10/295* (2015.11)

(58) Field of Classification Search
CPC ....... B33Y 30/00; B33Y 10/00; B29C 70/443; B29C 67/0077; Y02P 10/295; B28B 1/001
See application file for complete search history.

(56) References Cited

U.S. PATENT DOCUMENTS

| | | | |
|---|---|---|---|
| 8,845,319 | B2 * | 9/2014 | Oberhofer ............. B22F 3/1055 264/255 |
| 2002/0152002 | A1 | 10/2002 | Lindemann et al. |
| 2003/0205851 | A1 | 11/2003 | Laschutza et al. |
| 2005/0263932 | A1 | 12/2005 | Heugel |
| 2005/0263934 | A1 | 12/2005 | Chung |
| 2007/0245950 | A1 | 10/2007 | Teulet |
| 2010/0272519 | A1 | 10/2010 | Ederer et al. |
| 2012/0228807 | A1 | 9/2012 | Teulet |
| 2012/0267813 | A1 | 10/2012 | Perret et al. |
| 2013/0108726 | A1 | 5/2013 | Uckelmann et al. |
| 2014/0363585 | A1 * | 12/2014 | Pialot .................. B29C 67/0085 427/551 |
| 2017/0341365 | A1 * | 11/2017 | De Lajudie ............ B33Y 30/00 |

FOREIGN PATENT DOCUMENTS

| | | | |
|---|---|---|---|
| DE | 102007050679 | | 4/2009 |
| DE | 202011003443 | | 12/2011 |
| DE | 202011003443 | * | 2/2012 ............ A61C 13/15 |
| EP | 1234625 | | 8/2002 |
| JP | H09136139 A | | 5/1997 |
| JP | 2007216595 A | | 8/2007 |
| WO | 2008061727 | | 5/2008 |
| WO | 2011033215 | | 3/2011 |

OTHER PUBLICATIONS

International Search Report for PCT/EP2013/061402 dated Jan. 20, 2014.

* cited by examiner

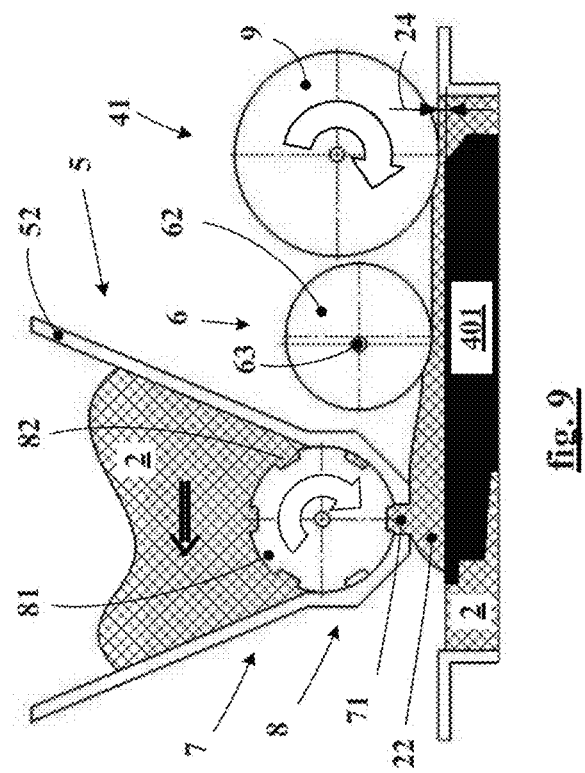
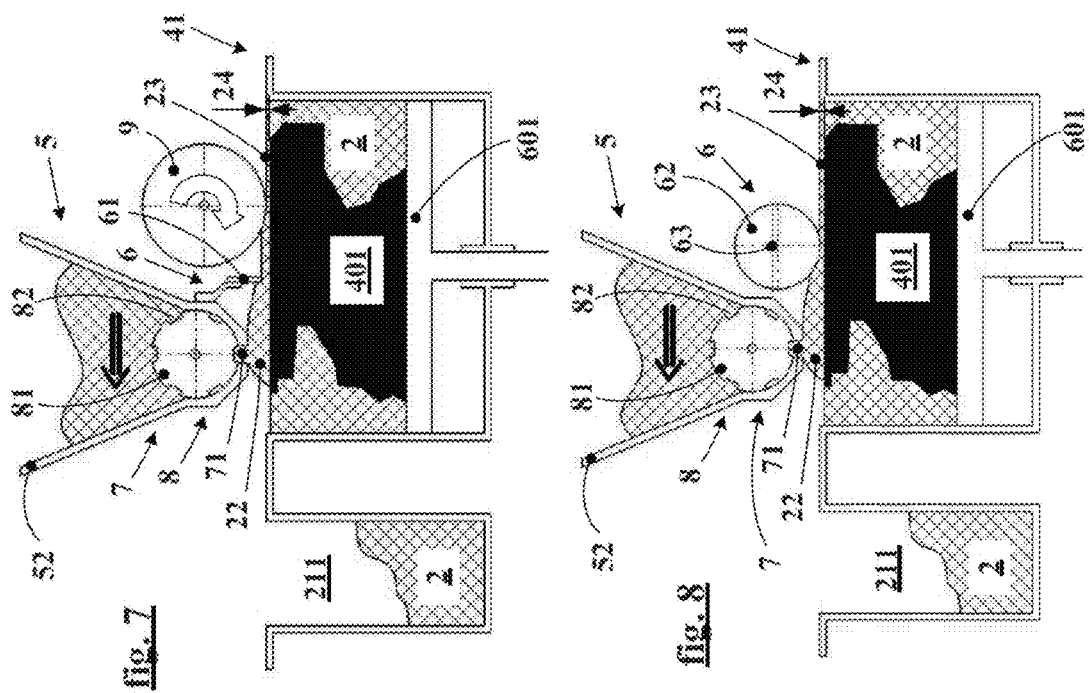

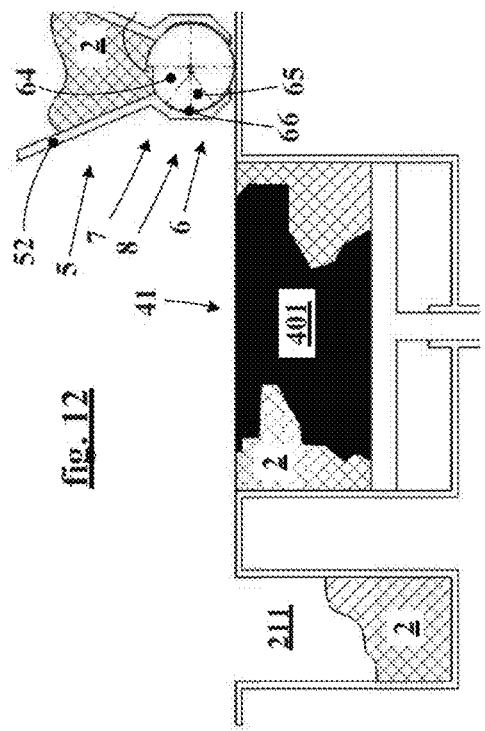
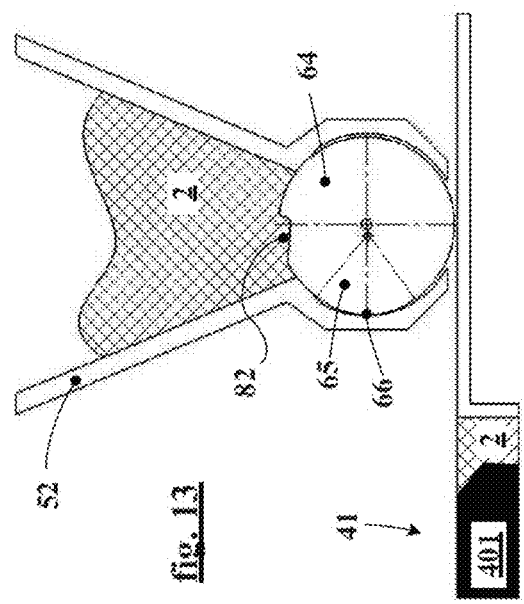
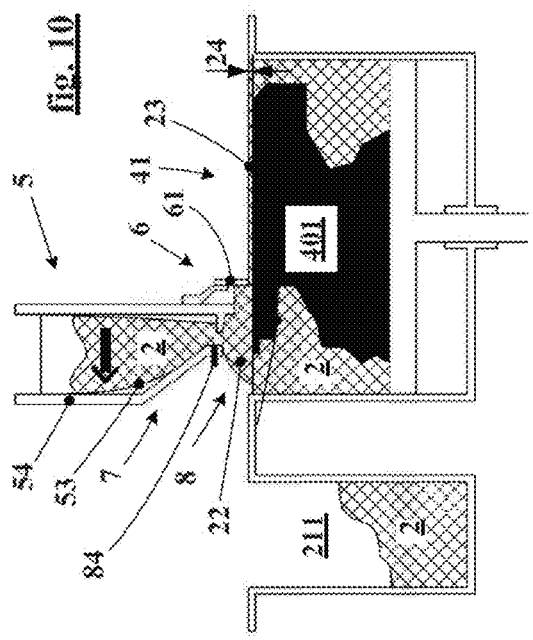
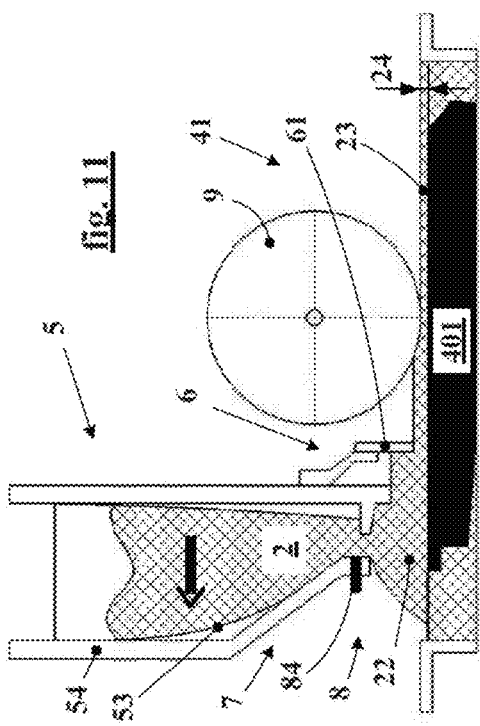

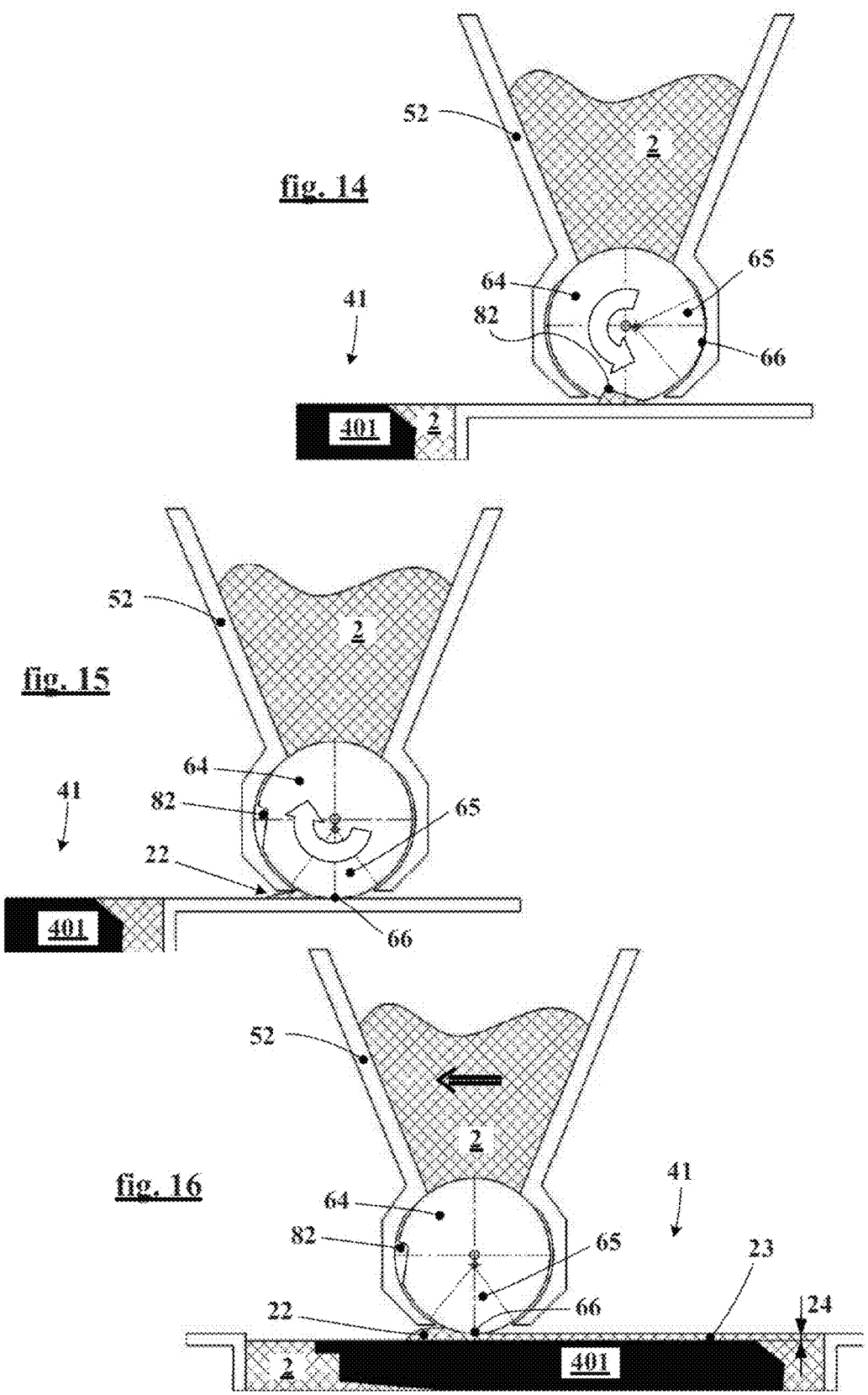

MACHINE AND METHOD FOR POWDER-BASED ADDITIVE MANUFACTURING

This application is a 371 national phase entry of PCT/EP2013/061402, filed 3 Jun. 2013, which claims benefit of French Patent Application Serial No. 1255089, filed 1 Jun. 2012, the entire contents of which are incorporated herein by reference for all purposes.

BACKGROUND

1. Field

The disclosure relates to the machines and processes for powder-based additive manufacturing by sintering or melting grains of said powder using an energy beam such as electromagnetic radiation (for example a laser beam) or a beam of particles (for example an electron beam).

In particular, the disclosure relates to the architecture of the machine and to the means and processes for layering, that is to say for preparing, the bed of powder prior to sintering or to melting of said layer using the energy beam.

2. Description of Related Art

Document EP-1641580-B1 in particular discloses a layering device for sintering powders (metallic or ceramic) by laser. This device comprises a feed tray that allows the powder to be stored and to be delivered in a controlled quantity to a grooved roll capable, on the one hand, of transferring said quantity of powder onto and distributing it over the depositing tray during a first passage of the roll over the working zone and, on the other hand, of compacting the powder by a rolling movement of the roll during a second passage. The powder is then subjected to the laser beam. One disadvantage of this configuration is the size and the considerable cost of the feed tray. Another disadvantage is derived from the fact that the length of the working zone is limited by the useful perimeter of the roll.

Document WO-2011/007087-A2 discloses a layering device for melting powders by laser. This device comprises a feed tray that allows the powder to be stored and to be delivered in a controlled quantity to a scraper system capable of feeding the depositing tray and roll(s) capable of distributing said quantity of powder over and compacting it on the depositing tray. The powder is then subjected to the laser beam. One disadvantage of this configuration is the size and the considerable cost of the feed tray and also the necessary complexity of the machine on account of the large number of tools to be controlled (scraper, distribution and/or compacting roll(s), rams for the trays).

Document U.S.-2005/0263934-A1 discloses a layering device for sintering powders by laser. This device comprises feeding and metering means that allow the powder to be delivered in a controlled quantity in the vicinity of the working zone. Feeding takes place by gravity from a stock of powder situated above. A scraper makes it possible to adjust the thickness of a mass of powder, which is then subjected to a preheating operation. A rotary roll then makes it possible to transfer said quantity of preheated powder to and distribute it over the working zone. A quantity of powder may likewise be deposited on the cover of the carriage carrying the roll from one side of the working zone to the other and is thus only applied during the return of the roll. One disadvantage of this configuration is the risk of a part (even a very small part) of the powder being retained on the cover and subsequently falling into the working zone during the passage of the carriage above the bed of powder. This risk is not acceptable in the context of industrial use.

An additional problem that is common to the various proposals in the art is low overall productivity of the installation, since melting is interrupted during the layering phases and, conversely, layering cannot take place during melting phases.

Another problem that is common to the various proposals in the art is the difficulty and sometimes the impossibility of achieving a homogeneous thickness and density for the powder layer over the entire extent (length, width) of the working zone.

SUMMARY

The object of embodiments of the invention is thus to overcome at least one of the disadvantages described above.

To this end, an embodiment of the invention proposes a machine for additive manufacturing by sintering or melting powder using an energy beam acting on a powder layer in a working zone, said machine comprising a device for layering said powder, said device comprising:

means for storing the powder,
means for distributing the powder that are able to travel over the working zone in order to distribute the powder in a layer having a final thickness suitable for additive manufacturing,
feeding means that are able to transfer the powder from the storage means to the distributing means,
metering means that are able to control the quantity of powder transferred from the storage means to the distributing means, said machine being characterized in that:

the storage means are positioned higher than the working zone,
the feeding means utilize gravity,
the feeding means and the metering means are able to move with the distributing means,
the machine has two separate working zones,
the machine has two separate working trays (601, 602) that are able to move independently of one another,
each of the two separate working trays (601, 602) is associated with only one of the two separate working zones (41, 42), and
the layering device is common to both working zones.

Thus, the melting operation in one of the two working zones can be carried out while a layering operation is taking place in the other working zone.

Preferably, the machine also comprises a central waiting zone located between the two working zones, said central waiting zone being able to accommodate the layering device. Thus, when it is inactive, the layering device can simultaneously free up the two working zones for the melting step, while remaining available for the application of a fresh layer of powder on one or the other working zone.

More preferably, the machine also comprises a source and means for controlling the energy beam, said source and means being inherent to each of the two working zones.

More preferably, the layering device is configured so as to carry out the layering by travelling over the working zone in the same direction for both working zones.

More preferably, the layering device is configured so as to carry out the layering in a single pass over a working zone.

Preferably, the storage means comprise a hopper, said hopper being able to move with the feeding means, the metering means and the distributing means.

Preferably, the metering means comprise a rotary metering roll provided with at least one cavity, preferably a groove capable of defining a metered quantity of powder during metering.

Alternatively, the metering means comprise a sliding hatch.

Preferably, the distributing means comprise a scraper.

Alternatively, the distributing means comprise a distributing roll, the height of which is preferably adjustable depending on its angular position.

According to a preferred embodiment of the invention, the distributing means and the metering means use a common roll.

Preferably, the machine according to the invention also comprises a compacting roller, the movement in translation of which is integral with the movement of the distributing means.

An embodiment of the invention also proposes a process for additive manufacturing by sintering or melting powder using an energy beam, comprising steps that consist successively of:
- A—depositing a layer of powder (23) in a working zone (41, 42) using a layering device,
- B—melting said layer of powder in the working zone (41, 42) using an energy beam (3) in a pattern corresponding to a section of the components,
- C—repeating steps A and B until the components are finished, said process being characterized in that:
- a machine having two separate working zones (41, 42) is used, each working zone resting on a separate working tray (601; 602), and in that
- a single layering device is used for both working zones.

Preferably, the layer of powder is deposited on the working zone by the layering device travelling over the working zone in the same direction for both working zones.

Preferably, a source and means for controlling the energy beam are used, said source and means being inherent to each of the two working zones.

BRIEF DESCRIPTION OF DRAWINGS

The embodiments of the invention will be better understood from the remainder of the description, which is based on the following figures:

FIG. 7 is a schematic cross-sectional view of the layering device of a preferred variant of the machine from FIG. 2.

FIG. 8 is a schematic cross-sectional view of the layering device of a machine according to a second embodiment of the invention.

FIG. 9 is a more detailed schematic cross-sectional view of a preferred variant of the layering device from FIG. 8.

FIG. 10 is a schematic cross-sectional view of the layering device of a machine according to a third embodiment of the invention.

FIG. 11 is a more detailed schematic cross-sectional view of a preferred variant of the layering device from FIG. 10.

FIG. 12 is a schematic cross-sectional view of the layering device of a machine according to a fourth embodiment of the invention.

FIGS. 13 to 16 are schematic views showing the layering device from FIG. 12 during successive layering steps.

DETAILED DESCRIPTION OF SPECIFIC EMBODIMENTS

In the various figures, identical or similar elements bear the same references or references that are clearly related to one another. Therefore, the description of their structure and their function is not repeated systematically.

Figure 1:
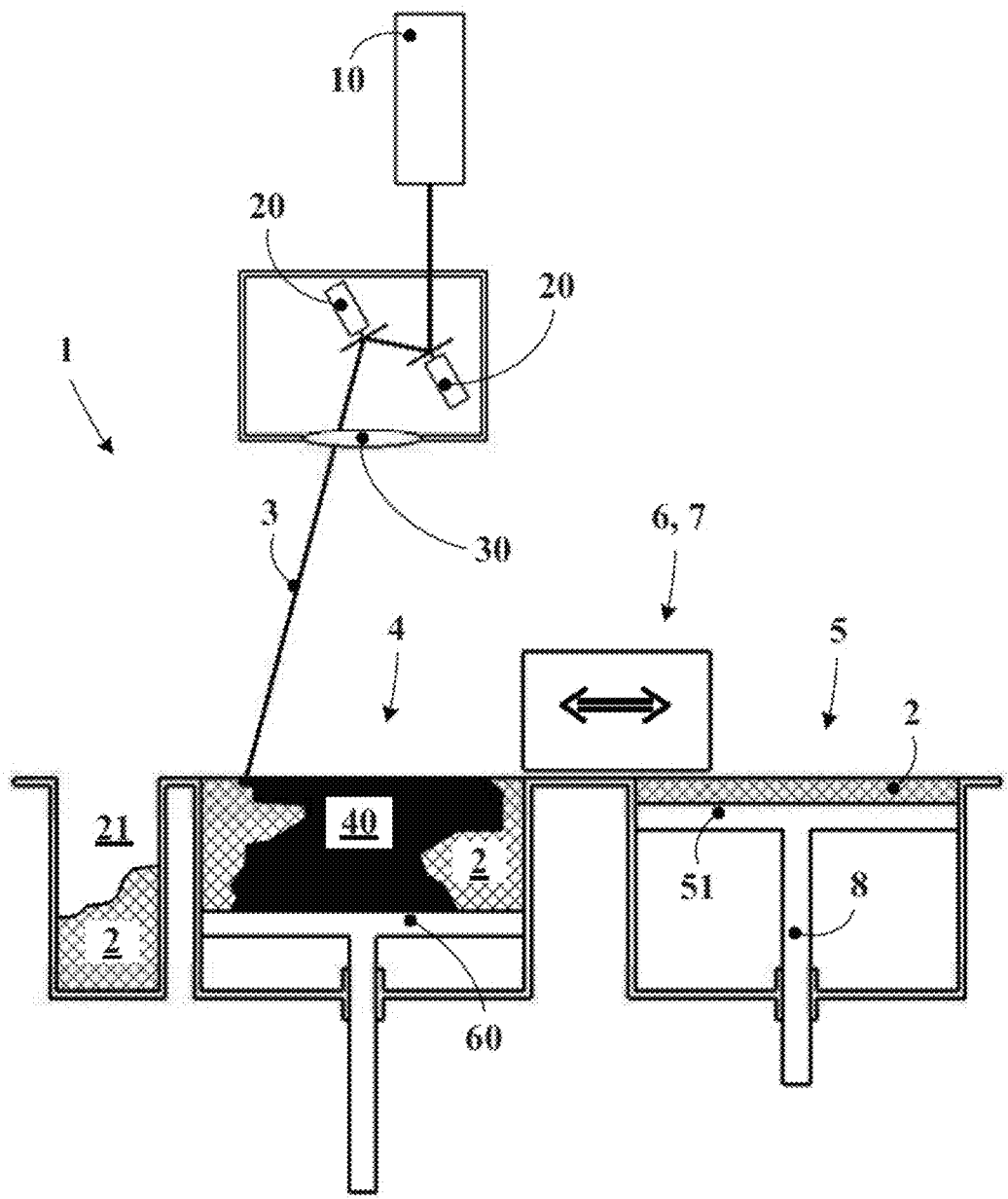
FIG. 1 is a schematic cross-sectional view of a machine according to the prior art.

FIG. 1 schematically shows a machine according to the art for the additive manufacturing of a component 40. An energy source, in this case a laser source 10, emits a laser beam 3, the orientation of which is controlled by mirrors subjected to galvanometers 20. An optical lens 30 focuses the beam 3 in the working zone 4 in order to heat the upper layer of the powder 2 in a precise pattern and thus to selectively melt the powder, the pattern corresponding to a section of the component to be produced. Following the treatment of a layer of powder by the beam, the working tray 60 is lowered by a unit thickness and is covered with a fresh layer of powder, and so on in order to form the component 40 layer by layer. Depending on the types of energy beam and the powders that are used, the thickness of a layer of powder may vary from a few micrometres (for example 10 µm) to several hundred micrometres (for example 500 µm=0.5 mm). When the component 40 is finished, that is to say when the hundreds or the thousands of layers necessary for its construction have been successively solidified, the component is removed from the working zone.

The parts of the machine for the application of a fresh layer of powder to the working zone are generally referred to as a whole as the "layering device". The layering device of the prior art comprises storage means 5 and means 6 for distributing the powder 2 over the working zone 4. As described above, the storage means of the prior art generally use a vertically movable tray 51, similar to the working tray 60. The distributing means 6 (not shown in detail in FIG. 1) have the function of distributing a thin layer of powder over the entire working zone. Feeding means 7 (not shown in detail in FIG. 1) have the function of transferring the powder from the storage means to the distributing means 6. The distributing means and the feeding means of the prior art commonly use scrapers and/or rollers carried by one or more carriages, said carriages being able to move between the storage means 5 and the working zone 4. Metering means 8, in this case means for precisely controlling the raising of the mobile tray 51, make it possible to control the quantity of powder employed each time the layering device is used. Once the distributing means have moved across the working zone (towards the left in FIG. 1), the surplus powder is pushed into a recovery container 21.

Figure 2:
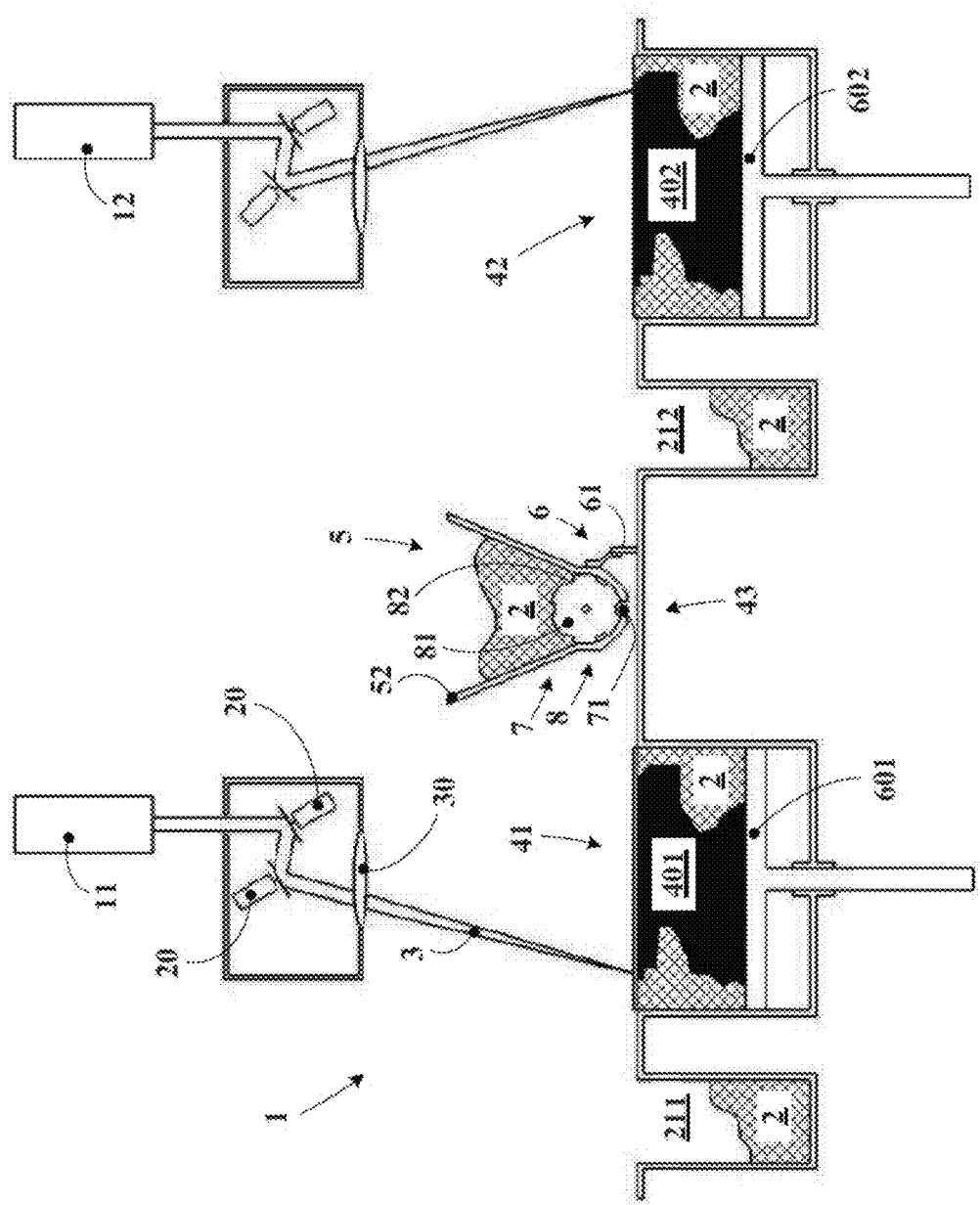
FIG. 2 is a schematic cross-sectional view of a machine according to a first embodiment of the invention.

FIG. 2 shows a first embodiment of the machine 1 according to the invention. An essential feature of the machine according to the invention is that it has two separate working zones 41 and 42 and that the layering device is common to both of these working zones. The machine thus has two separate working trays 601 and 602 that are able to move independently of one another, each of the two zones resting on its own working tray. The two working zones are coplanar. The source and the control of the energy beam are shown in a manner that is identical to FIG. 1. This is only one example of such an arrangement, however. As described in the preamble to the application, the invention is applicable in reality to all types of powder-based additive manufacturing by sintering or by completely melting the grains of said powder using an energy beam such as electromagnetic radiation (for example a laser beam) or a beam of particles (for example an electron beam). Therefore, the rest of the present description will concentrate mainly on the process and the layering device and on the cooperation of the layering device with the two working zones. Preferably, the machine comprises a central waiting zone 43 located between the two working zones. When the layering device is parked in the waiting zone, the two working zones can be used for melting. If the waiting zone is located, as here, between the two working zones, this also allows the layering device to come into action in either one of the two working zones without interrupting or disturbing the work in the other zone.

A preferred embodiment in which the machine also comprises, for each working zone, an individual source (11, 12) and individual means for controlling the energy beam is shown here. However, it is also possible to use a single source which is moved or the beam of which is diverted alternately over one zone or the other, as described for example in document EP 1517779-B1. The degrees of use of the common source may then tend towards 100%. The advantage of a configuration using a single source is mainly that of further lowering the cost of the machine according to an embodiment of the invention. In the case shown in FIG. 2, where the machine comprises a source individual to each working zone, it is possible for the machine to simultaneously carry out the melting of the powder in the left-hand working zone 41 and right-hand working zone 42 when the layering device is positioned in the central waiting zone 43. It will be understood that the overall productivity of the machine is favoured even though the degrees of use of each of the two sources remain well below 100%.

The storage means 5 are in this case in the form of a hopper 52 positioned above the plane of the working zones 41 and 42. The distributing means 6 use a scraper 61. The scraper is integral with the hopper. The feeding means 7 use simply a lower opening 71 in the hopper in order to transfer the powder towards the distributing means 6 by gravity. Metering means, in this case in the form of a rotary metering roll 81 comprising at least one cavity, make it possible to control the quantity of powder transferred. Said cavity, preferably a groove 82, defines a reproducible metered quantity of powder. The groove(s) 82 extend(s) substantially along the entire useful length of the metering roll 81, that is to say substantially over the entire width of the working zones 41 and 42. The dimensions and shape of the section of the grooves 82 can vary along the roll 81 in order to further improve the distribution of the powder over the entire working zone.

FIGS. 3 to 6 schematically show typical successive steps in the manufacturing process made possible by the machine according to an embodiment of the invention.

Figure 3:
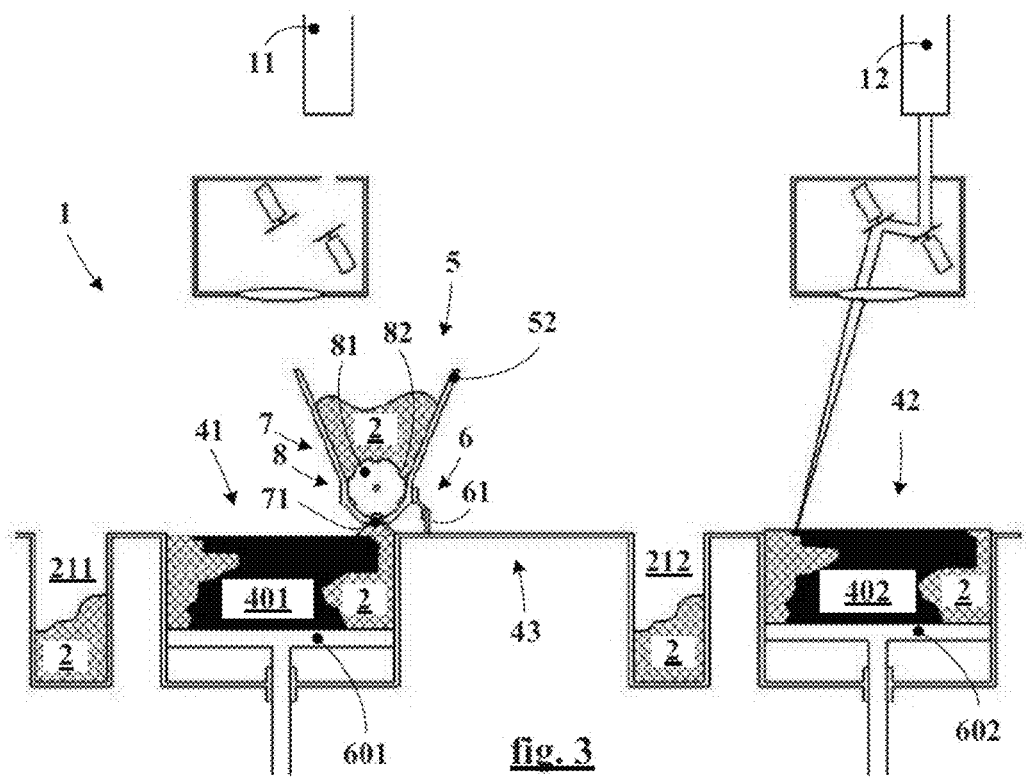
FIGS. 3, 4, 5 and 6 are schematic views of typical steps in the manufacturing process made possible by the machine according to an embodiment of the invention.
Figure 4:
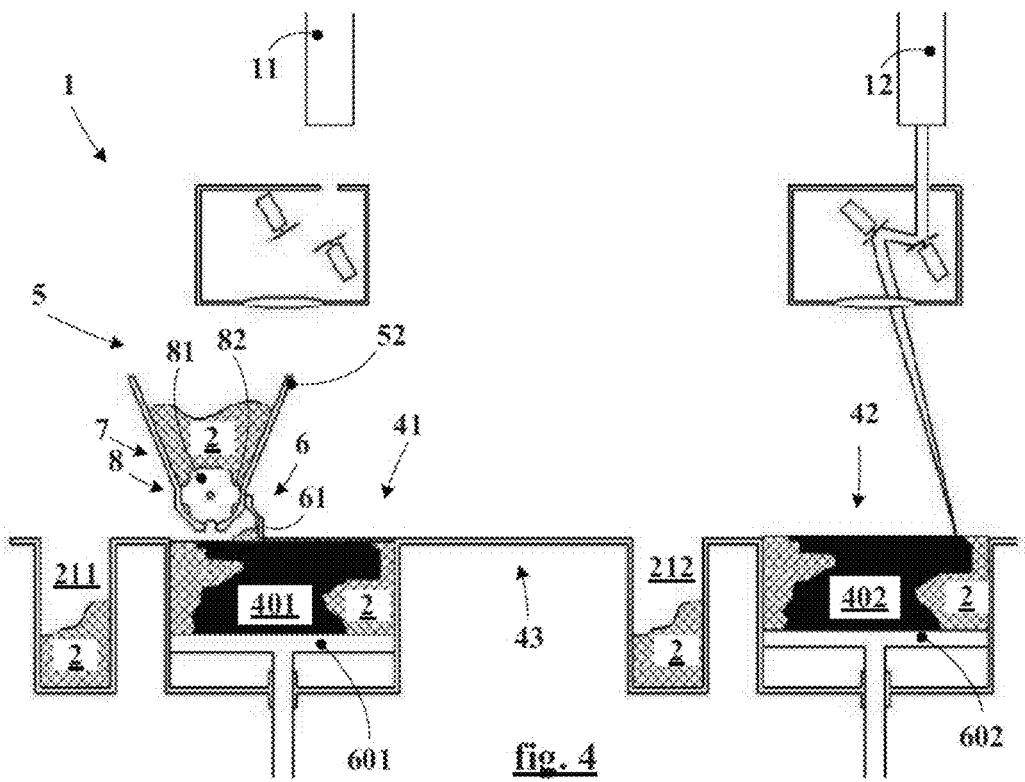
Figure 5:
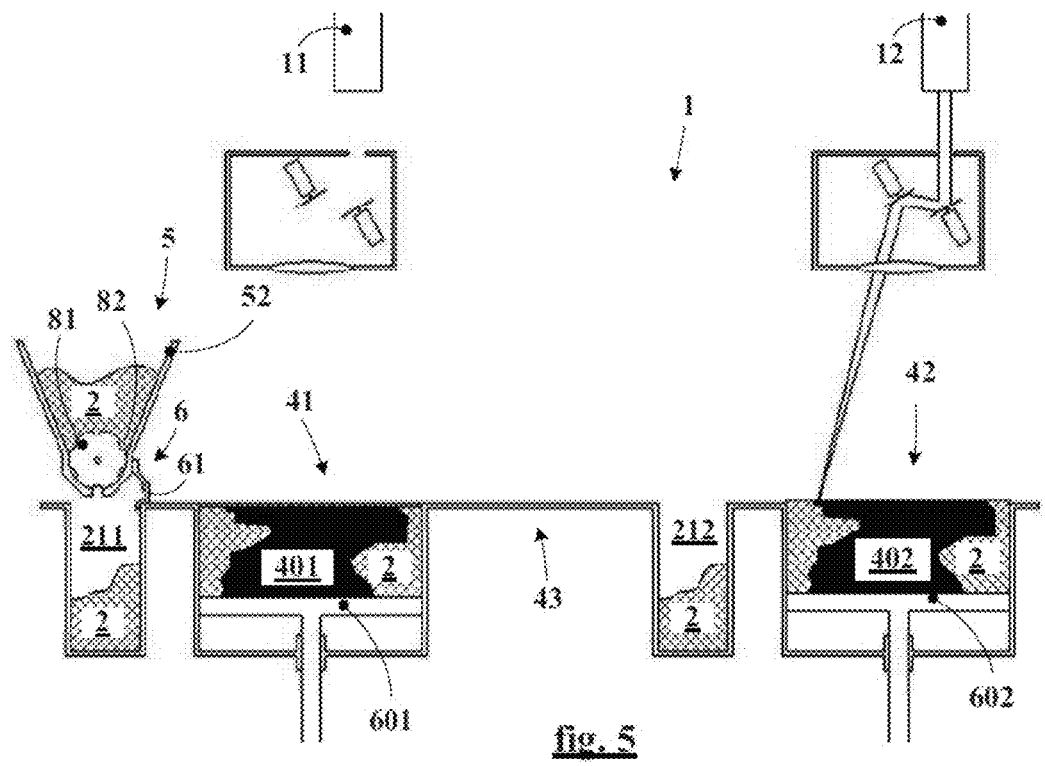

In FIGS. 3, 4 and 5, it is possible to see that a layer of powder is progressively deposited on the left-hand working zone 41 by the layering device. In parallel with this layering, the melting of a previously deposited layer of powder takes place in the other working zone (right-hand working zone 42) in order to progressively form a right-hand component 402.

More specifically, FIG. 3 shows that a first quantity of powder is deposited on the working zone through the opening 71. Said quantity of powder may correspond to one or more metered quantities, that is to say to the contents of one or more grooves 82 in the metering roll 81.

In FIG. 4, the distributing means 6 in the form of a scraper 61 distribute the powder in a thin layer over the working zone 41. Preferably, fresh metered quantities of powder are progressively added by the feeding means during the movement of the distributing means.

In FIG. 5, the layering device, after having travelled along the entire length of the working zone 41, pushes the surplus powder into the recovery container 211 associated with this working zone. The layer of powder is then ready to be melted.

When the layering is finished on the left-hand working zone 41, the layering device can be positioned in the central waiting zone 43 in order to be immediately available for the preparation of a fresh layer of powder on one or the other of the working zones. It is thus possible for the melting of the powder to take place simultaneously in both working zones, as shown in FIG. 2.

Figure 6:
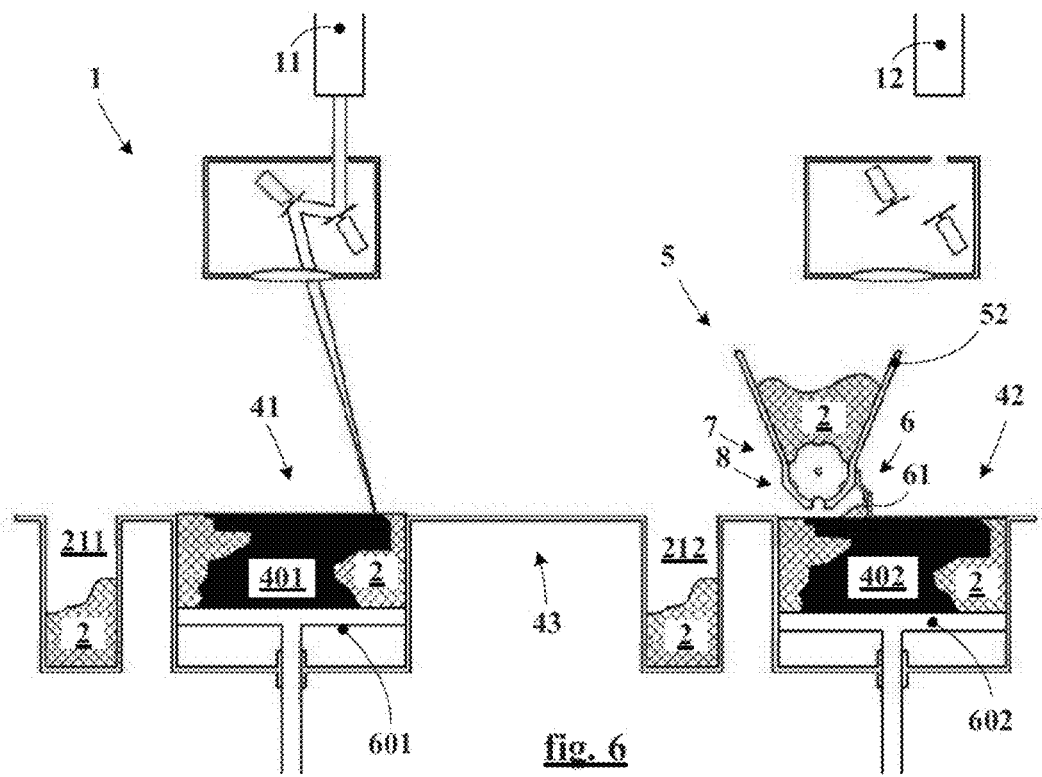

As soon as the melting of one layer is finished in the right-hand working zone 42, the right-hand working tray 402 can be lowered and the layering device can deposit a fresh layer of powder on this working zone, as shown in Figure 6. Thus, the single layering device is used alternately in both working zones. Of course, it will be understood that in practice the layering sequences do not necessarily alternate between the two working zones. This depends on the time that is effectively necessary for the melting for each layer of each of the two components 401 and 402. For example, it is quite possible for the melting time for a layer in one of the working zones to be relatively long while, at the same time, two or more layers can be deposited and melted in the other working zone. It is also possible for the layers deposited and melted in one of the components to be multiplied while the other component is being removed from the machine and/or while the working zone is being prepared for the manufacture of a new component. Thus, the important point is that the machine according to the invention makes it possible to work virtually independently in the two working zones, in particular in the case shown here, where it comprises two energy beam sources, one for each working zone.

Preferably, the layering device makes it possible to carry out layering in a single pass, by sweeping over each of the two working zones in the same direction, for example from right to left, as shown in FIGS. 3 to 6. This choice of an asymmetric architecture and operation of the machine allows a more simple and thus lighter design of the layering device.

FIG. 7 shows, on a larger scale, the layering device from the preceding figures during the operation of layering on one of the working zones, in this case the left-hand working zone 41. The thicknesses of powder are generally shown in highly magnified manner in the present application in order for them to be readily visible to the reader, as is frequently the case in the documents of the art. This is because it is impossible to show for example a thickness of 50 μm and a working zone of 500 mm in length in the same drawing while faithfully respecting the proportions.

In FIG. 7, the hopper 52 moves towards the left-hand side of the figure at the same time as the scraper 61. The scraper distributes the layer of powder over the working zone 41 and smooths it therein. The mass 22 of powder located in front of the scraper is metered by the metering roll 81. The powder can be added in one go for each layer. However, preferably, metering is progressive, that is to say that the addition of powder takes place progressively in that the contents of a groove are delivered a number of times during the passage over the working zone, thereby making it possible to reduce the variability of the working conditions of the scraper and thus to ensure an improved regularity of the thickness and the compactness of the bed of powder obtained.

FIG. 7 also illustrates a preferred variant of the first embodiment of the invention, in which a compacting roller 9 is also used. The final thickness 24 of the layer 23 of powder is thus the result of two successive operations. A first thickness is defined by the distributing means 6, in this case the scraper 61. This thickness is reduced and made even more homogeneous by the action of the compacting roller 9. The roller moves with the hopper and the scraper. More preferably, the roller is counter-rotating, that is to say that it is motorized so as to rotate in the opposite direction to its movement relative to the bed of powder (as indicated by the arrow, which shows a rotation in the clockwise direction, while the roller is moving towards the left).

FIG. 8 shows a second embodiment of the layering device, in which the distributing means 6 use a distributing roll 62 rather than the scraper of the first embodiment. The movement of the distributing roll 62 is linked to that of the hopper 51, as in the case of the scraper 61 of the first embodiment. The roll 62 may be rotationally fixed or counter-rotating. When the distributing roll is fixed, its fixation 63 is preferably eccentric, thereby making it possible to finely adjust its height and thus the final thickness 24 of the layer of powder 23 obtained.

As shown in FIG. 9, a counter-rotating compacting roller 9 may be advantageously associated with the layering device according to the second embodiment under the same conditions as those described above with reference to FIG. 7.

FIG. 10 shows a third embodiment. It differs from the first embodiment mainly in that the metering means 8 use a sliding hatch 84, the duration and amplitude of opening of which determine the quantity of powder transferred to the distributing means 6. Preferably, the storage means 5 use a flexible hopper 53 carried by a hopper support 54, so as to reduce the risk of clogging of the powder. Depending on the types of powder used, additional active unclogging means (not shown) may be employed.

FIG. 11 shows, on a larger scale, a variant of the third embodiment, also comprising a counter-rotating compacting roller 9, the movements of which are integral with the scraper and the hopper, as described above with reference to FIG. 7.

FIG. 12 shows a fourth embodiment of the layering device according to the invention, in which the metering means 8 and the distributing means 6 use a common rotary roll 64. The distributing function is ensured by virtue of a groove 82 in the common roll 64 in accordance with the principle described above with reference to FIG. 2. The distributing function is ensured by a smoothing portion 65 of the common roll 64 in accordance with the principle described above with reference to FIG. 8. One advantage of this embodiment is that it makes it possible to further lighten the layering device of the machine according to the invention. Preferably, the common roll 64 is rotationally fixed during its movement over the working zone. The smoothing portion 65, that is to say that part of the roll that is intended to distribute the powder, is symbolically delimited by dotted lines in FIGS. 12 to 16. Preferably, this portion has a bulge 66. This bulge, which has a small overall height (for example a few tenths of a millimetre at most) is scarcely perceptible in the figures, in spite of its magnification.

The operation of this embodiment is shown in detail in FIGS. 13 to 16, which show the successive configurations of the device during a layering cycle.

In FIG. 13, the layering device is in a waiting configuration, as for example between two successive layers. The powder 2 is retained in the hopper 52 closed by the hermetic contact of the common roll 64. The groove 82 can then be filled with powder.

In FIG. 14, the common roll 64 has rotated through about half a turn in the anticlockwise direction and has deposited a metered quantity of powder in the vicinity of the working zone 41.

In FIG. 15, the common roll 64 has rotated through about a quarter of a turn in the clockwise direction in order to bring the smoothing portion 65 into contact with the mass of powder 22 and at the appropriate height. The fact that the smoothing portion has a bulge 66 makes it possible to finely adjust the smoothing thickness by the choice of the angular position adopted by the common roll 64.

In FIG. 16, the layer device is passing over the working zone 41, as described above, pushing the mass of powder 22 over the component 401 in order to smooth a layer of powder 23 with a final thickness 24. In order to limit the variations in pressure along the entire length of the working zone, the feeding phase described in FIGS. 13 and 14 may be repeated one or more times during a single passage over the working zone, in which case the metered quantity defined by the groove 82 preferably represents a fraction of the quantity of powder necessary for a complete layer.

Alternatively, the powder depositing phase may be carried out a number of times in succession without any smoothing movement in order to create, in the configuration in FIG. 15, a mass 22 corresponding to a plurality of unit doses as defined by the groove 82.

It should be recalled that (as explained above) the thicknesses of the layers, the volumes of the masses, of the grooves or of the bulge 66 are not shown on a consistent scale but, on the contrary, have been deliberately distorted for the purpose of making the figures legible.

Of course, as described for the other embodiments of the invention, the layering device in Figures 12 to 16 may also comprise a counter-rotating compacting roller (not shown here).

It will be understood that a layer can be produced according to an embodiment of the invention in a single pass, that is to say in a single passage over the working zone, whether this be the one working zone or the other. Preferably, the quantity of powder stored in the hopper is sufficient to produce hundreds, or even thousands, of layers, that is to say that the machine could achieve additive manufacturing of one or more complete component(s), without the hopper being refilled. Preferably, the hopper is refilled at a time when the layering device is not in operation. Refilling can be carried out for example when the manufacturing of the components has been finished and the finished components have been removed before a new manufacturing operation starts, but also during the melting phases (including simultaneous melting phases in both working zones).

The powder used is preferably a metallic or ceramic powder. Depending on the types of energy beams that are employed and depending on the intended thickness of the final layer, the mean diameter of the particles of the powder can vary from a few micrometres (for example 5 μm) to 300 or 400 μm.

The description of the machine and the process according to embodiments of the invention which has just been given with reference to drawings showing mainly only the left-hand part of the machine (for reasons of scale) also applies of course to the right-hand part. On the other hand, a person skilled in the art will understand that it is not necessary for the two parts of the machine to be identical. A person skilled in the art will also understand that the various embodiments described and illustrated here are specific examples of combinations of means according to the invention. Other obvious combinations or substitutions of the various means are also part of the invention, for example the replacement in the third embodiment (FIGS. 10 and 11) of the scraper 61 with a distributing roll 62 according to the second embodiment in FIGS. 8 and 9. Similarly, the principle of the invention of associating two working zones with a layering device common to these two working zones may be implemented with other types of layering device than those described in the present application, that is to say with other types of layering device than those that are fed via the top.

The invention claimed is:

1. A machine for additive manufacturing by sintering or melting powder using an energy beam acting on a powder layer in a working zone, comprising:
   a device for layering said powder, said device comprising;
      a storage means for storing the powder,
      a distributing means for distributing the powder that are able to travel over the working zone in order to distribute the powder in a layer having a final thickness suitable for additive manufacturing,
      a feeding means that are able to transfer the powder from the storage means to the distributing means,
      a metering means that are able to control the quantity of powder transferred from the storage means to the distributing means,
      wherein the storage means are positioned higher than the working zone,
      wherein the feeding means utilize gravity, and
      wherein the feeding means and the metering means are able to move with the distributing means;
   two separate working zones;
   two separate surplus powder recovery chambers which are each associated with only one of the two separate working zones and wherein one of the surplus powder recovery chambers is located between the two working zones; and
   two separate working trays that are able to move independently of one another, wherein:
      each of the two separate working trays is associated with only one of the two separate working zones, and
      the device for layering said powder is common to both working zones.

2. The machine according to claim 1, further comprising a central waiting zone located between the two working zones, said central waiting zone being able to accommodate the layering device.

3. The machine according to claim 1, further comprising a source and means for controlling the energy beam, wherein said source and means are individual to each of the two working zones.

4. The machine according to claim 1, wherein the device for layering said powder is configured so as to carry out the layering by travelling over the working zone in the same direction for both working zones.

5. The machine according to claim 1, wherein the device for layering said powder is configured so as to carry out the layering in a single pass over a working zone.

6. The machine according to claim 1, wherein the storage means comprises a hopper, said hopper being able to move with the feeding means, the metering means and the distributing means.

7. The machine according to claim 1, wherein the metering means comprises a rotary metering roll provided with at least one cavity.

8. The machine according to claim 1, wherein the metering means comprises a sliding hatch.

9. The machine according to claim 1, wherein the distributing means comprises a scraper.

10. The machine according to claim 1, wherein the distributing means comprises a distributing roll.

11. The machine according to claim 10, wherein the height of the distributing roll above a plane of the working zones is adjustable depending on the angular position of said roll.

12. The machine according to claim 7, wherein the distributing means is on said rotary metering roll.

13. The machine according to claim 1, further comprising a compacting roller, the movement in translation of which is integral with the movement of the distributing means.

14. The machine according to claim 7, wherein the at least one cavity comprises a groove capable of defining a metered quantity of powder during metering.

15. The machine according to claim 2 wherein the at least one of the surplus recovery zones that is located between the two working zones is located adjacent the central waiting zone.

16. The machine according to claim 13 wherein the compacting roller is configured to reduce a thickness of the layer produced by the device to a final thickness.

17. The machine according to claim 1 wherein the surplus powder recovery chamber that is located between the two working zones is located between the two working zones in a travelling direction of the feeding means, the metering means, and the distributing means.

18. The machine according to claim 1 wherein each surplus powder recovery chamber is located on the same side of the associated working zone.

19. A machine for additive manufacturing by sintering or melting powder using an energy beam acting on a powder layer in a working zone, comprising:
   a device for layering said powder, said device comprising;
      a storage means for storing the powder,
      a distributing means for distributing the powder that are able to travel over the working zone in order to distribute the powder in a layer having a final thickness suitable for additive manufacturing,
      a feeding means that are able to transfer the powder from the storage means to the distributing means,
      a metering means that are able to control the quantity of powder transferred from the storage means to the distributing means,
      wherein the storage means are positioned higher than the working zone,
      wherein the feeding means utilize gravity, and
      wherein the feeding means and the metering means are able to move with the distributing means;
   two separate working zones;
   two separate surplus powder recovery chambers which are each associated with only one of the two separate working zones and wherein one of the surplus powder recovery chambers is located between the two working zones; and
   two separate working trays that are able to move independently of one another, wherein:
      each of the two separate working trays is associated with only one of the two separate working zones, and
      the device for layering said powder is common to both working zones;

wherein the two separate working zones are each fixed in place relative to a given position of the storage means.

* * * * *